(12) United States Patent
Mathew et al.

(10) Patent No.: US 12,024,862 B2
(45) Date of Patent: Jul. 2, 2024

(54) SYSTEM AND METHOD OF AUTONOMOUSLY CLEARING A WINDROW

(71) Applicant: Caterpillar Inc., Peoria, IL (US)

(72) Inventors: Shawn N. Mathew, Savoy, IL (US); Yang Liu, Champaign, IL (US); Yongtao Li, Urbana, IL (US)

(73) Assignee: Caterpillar Inc., Peoria, IL (US)

( * ) Notice: Subject to any disclaimer, the term of this patent is extended or adjusted under 35 U.S.C. 154(b) by 584 days.

(21) Appl. No.: 16/784,673

(22) Filed: Feb. 7, 2020

(65) Prior Publication Data

US 2021/0246636 A1 Aug. 12, 2021

(51) Int. Cl.
*E02F 9/26* (2006.01)
*E02F 3/84* (2006.01)
*E02F 9/20* (2006.01)

(52) U.S. Cl.
CPC .............. *E02F 9/262* (2013.01); *E02F 3/842* (2013.01); *E02F 3/847* (2013.01); *E02F 9/2045* (2013.01)

(58) Field of Classification Search
CPC . E02F 9/262; E02F 3/842; E02F 3/847; E02F 9/2045; E02F 9/0841; E02F 3/7636; E02F 3/841; E01C 2301/06; A01D 89/007
See application file for complete search history.

(56) References Cited

U.S. PATENT DOCUMENTS

| | | | |
|---|---|---|---|
| 4,397,674 A * | 8/1983 | Laughbaum | C05F 17/943 71/21 |
| 6,088,644 A | 7/2000 | Brandt et al. | |
| 6,100,895 A * | 8/2000 | Miura | G06T 15/80 345/426 |
| 6,169,516 B1 * | 1/2001 | Watanabe | G09B 29/106 340/995.14 |
| 7,876,927 B2 * | 1/2011 | Han | G06V 20/588 340/995.25 |
| 9,014,925 B2 | 4/2015 | Clar et al. | |
| 9,234,329 B2 | 1/2016 | Jaliwala et al. | |
| 9,637,887 B2 * | 5/2017 | Wighton | E02F 3/46 |
| 9,678,210 B2 | 6/2017 | Friend et al. | |
| 9,791,863 B2 * | 10/2017 | Derscheid | G05D 1/0278 |

(Continued)

FOREIGN PATENT DOCUMENTS

| | | |
|---|---|---|
| CN | 110322457 | 10/2019 |
| EP | 2854106 | 4/2015 |

(Continued)

OTHER PUBLICATIONS

Written Opinion and International Search Report for INternational Patent Appin No. PCT/US2021/016119, dated May 14, 2021 (10 pgs).

(Continued)

*Primary Examiner* — Angelina Shudy (57) ABSTRACT

A controller-implemented method for automated control of at least one of an autonomous or semiautonomous machine to clear at least one windrow along a work surface. The method includes utilizing a visual perception sensor to detect said windrow, generating a plurality of windrow visual detection signals, determining a position of a windrow relative to the machine based upon the plurality of windrow visual detection signals, and generating machine control commands to clear the windrow.

20 Claims, 6 Drawing Sheets

(56) References Cited

U.S. PATENT DOCUMENTS

| | | | |
|---|---|---|---|
| 10,888,043 B2* | 1/2021 | Thompson | A01B 69/007 |
| 10,975,552 B2* | 4/2021 | Ono | E02F 3/764 |
| 11,197,428 B2* | 12/2021 | Thompson | A01F 15/08 |
| 2003/0128182 A1* | 7/2003 | Donath | G01C 21/26 345/156 |
| 2004/0158355 A1 | 8/2004 | Holmqvist et al. | |
| 2008/0065286 A1 | 3/2008 | Han et al. | |
| 2008/0065287 A1* | 3/2008 | Han | G05D 1/0278 701/28 |
| 2010/0178107 A1* | 7/2010 | Braddy | E01C 23/01 404/108 |
| 2010/0318253 A1* | 12/2010 | Brubaker | A01F 15/0833 701/25 |
| 2014/0090347 A1* | 4/2014 | Peden | A01D 57/12 56/341 |
| 2014/0300732 A1 | 10/2014 | Friend et al. | |
| 2014/0324291 A1 | 10/2014 | Jones et al. | |
| 2015/0089912 A1* | 4/2015 | Patton | A01D 57/28 56/10.2 R |
| 2015/0134175 A1* | 5/2015 | Derscheid | A01F 15/0825 701/23 |
| 2015/0247301 A1* | 9/2015 | Wighton | E02F 3/18 701/50 |
| 2015/0324658 A1* | 11/2015 | Zhang | G06F 18/256 382/203 |
| 2015/0332463 A1 | 11/2015 | Galera et al. | |
| 2015/0379721 A1* | 12/2015 | Good | G06T 7/593 348/47 |
| 2017/0013772 A1* | 1/2017 | Kirk | A01F 15/071 |
| 2017/0016870 A1* | 1/2017 | McPeek | G01S 17/89 |
| 2017/0357267 A1 | 12/2017 | Foster et al. | |
| 2017/0364089 A1* | 12/2017 | Strautmann | A01F 25/2027 |
| 2018/0107904 A1* | 4/2018 | Yang Mao | G01S 17/89 |
| 2018/0111769 A1* | 4/2018 | Yuvaraj | B25J 9/1687 |
| 2018/0113467 A1* | 4/2018 | Kim | A47L 9/1683 |
| 2018/0144547 A1 | 5/2018 | Shakib et al. | |
| 2018/0317388 A1* | 11/2018 | Gresch | A01F 15/08 |
| 2018/0325013 A1* | 11/2018 | Boydens | G05D 1/0231 |
| 2018/0325032 A1* | 11/2018 | Rotole | G05D 1/0278 |
| 2018/0354415 A1 | 12/2018 | Kamimae et al. | |
| 2018/0355569 A1 | 12/2018 | Kamimae et al. | |
| 2019/0047345 A1* | 2/2019 | Dockter | G05D 1/021 |
| 2019/0106862 A1* | 4/2019 | Ono | G05D 1/0242 |
| 2019/0162855 A1* | 5/2019 | McPeek | G01C 21/1652 |
| 2019/0180467 A1* | 6/2019 | Li | G01S 17/93 |
| 2019/0191615 A1* | 6/2019 | Thompson | B62D 11/02 |
| 2019/0311546 A1* | 10/2019 | Tay | G05D 1/0088 |
| 2019/0332120 A1* | 10/2019 | Choi | B60W 60/00186 |
| 2020/0011033 A1* | 1/2020 | Sherlock | E02F 9/262 |
| 2020/0029490 A1* | 1/2020 | Bertucci | G05D 1/0276 |
| 2020/0125830 A1* | 4/2020 | Lei | G06T 7/90 |
| 2020/0167941 A1* | 5/2020 | Tong | G06F 18/251 |
| 2021/0041539 A1* | 2/2021 | Darrer | G01S 7/4863 |
| 2021/0092893 A1* | 4/2021 | Thompson | B62D 11/02 |
| 2021/0195825 A1* | 7/2021 | Zhou | A01B 69/008 |
| 2021/0195827 A1* | 7/2021 | Zhou | A01B 79/005 |
| 2021/0215811 A1* | 7/2021 | Couture | G01S 17/931 |
| 2021/0246636 A1* | 8/2021 | Mathew | E02F 3/7636 |
| 2021/0382490 A1* | 12/2021 | Wilson | G01V 3/12 |
| 2022/0002966 A1* | 1/2022 | Takaoka | E02F 9/2045 |
| 2022/0061221 A1* | 3/2022 | Good | A01D 89/006 |
| 2022/0063617 A1* | 3/2022 | Good | G01S 13/88 |
| 2022/0284662 A1* | 9/2022 | Bond | G06N 20/00 |
| 2022/0349781 A1* | 11/2022 | Mori | B60W 50/0098 |
| 2022/0386533 A1* | 12/2022 | Hill | A01D 57/30 |

FOREIGN PATENT DOCUMENTS

| | | |
|---|---|---|
| EP | 1738630 | 11/2018 |
| EP | 3871481 A1 * | 9/2021 |
| JP | 2013153280 A | 8/2013 |
| JP | 6131385 | 5/2017 |
| JP | 2017176007 | 10/2017 |
| KR | 1020140111148 | 9/2014 |
| WO | WO-2017201466 A1 * | 11/2017 |
| WO | 2019176193 A1 | 9/2019 |

OTHER PUBLICATIONS

European Search Report for EP Patent Appln. No. 21750979.3, mailed Feb. 7, 2024 (8 pgs).

* cited by examiner

SYSTEM AND METHOD OF AUTONOMOUSLY CLEARING A WINDROW

TECHNICAL FIELD

This patent disclosure relates generally to a method and steering system for an autonomous machine, and, more particularly, to a method and system for steering an autonomously operated machine to clear windrows.

BACKGROUND

Machines such as dozers, motor graders, wheel loaders, etc., are used to perform a variety of tasks, such as road clearing, digging, loosening, carrying, etc., different materials at the work site such as those related to mining, earthmoving and other industrial activities. Performing operations like road clearing may result in the creation of windrows as material is moved by a tool, such as a blade.

The machines may operate in an autonomous, semi-autonomous, or manual manner to perform these tasks in response to commands generated as part of a work plan for the machines. Autonomously operated and semi-autonomously operated machines may offer certain advantages over manually operated machines. For example, autonomously operated and semi-autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

Autonomous or semi-autonomous systems may additionally be desirable when performing complicated tasks or in operating machines that require manipulation of various controls simultaneously. For example, articulated machines such as motor graders include a front frame member, a rear frame member, and an articulation joint connecting the front and rear frame members, as well as a movable tool in the form of a blade. Machines having a broad wheel base with two pairs of rear wheels and a spaced pair of front wheels, as in a motor grader, present additional steering and operational challenges. Steering of a machine such as a motor grader, including control and movement of the articulated joint and maintaining traction to the wheels when turning presents a challenge that is further complicated by operation of a movable tool while preferably maintaining a relatively constant load on the blade. As a result, performing tasks that require steering of the machine, as well as operation of the machine based upon visual or obscured features such as the clearing of windrows at a worksite may be particularly challenging.

U.S. Publication No. 2019/0106862 A1 to Ono et al. discloses a control system for the clearing of windrows by an autonomous machine having a work implement. The '862 publication uses a mmWave sensor to locate a windrow and correlate it to a corresponding GPS location. These GPS locations are stored at a base station. The autonomous machine then reads the GPS points from the base station and follows the GPS location points to clear the windrow. These systems require high precision equipment that may be relatively expensive. Further, the operation of such systems may be limited by the use of GPS, which may provide unreliable results in cities, tunnels, or the like.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

The disclosure is directed to a method for autonomously clearing a windrow along a work surface of a machine. The method includes detecting the windrow via a visual perception sensor coupled to a controller, generating, via the controller, a plurality of windrow visual detection signals, determining a position of the windrow relative to the machine based on the plurality of windrow visual detection signals, and generating via the controller, a plurality of machine control commands to clear the windrow.

The disclosure also is directed to a system for automated control of a machine to clear at least one windrow along a work surface. The system includes a visual perception sensor and a controller. The visual perception sensor is mounted with the machine. The visual perception sensor is adapted to provide a three-dimensional data and to generate a plurality of windrow detection signals. The controller is configured to receive the plurality of windrow detection signals, and determine the position of a windrow relative to the machine. The controller is further configured to access steering parameters of the machine, and generate machine control commands to clear the windrow. The machine control commands include at least one of a steering command, a propulsion command, and an implement control command.

The disclosure also relates to a machine including a prime mover, a ground-engaging work implement for engaging a work surface along a path, a visual perception sensor and a controller. The visual perception sensor is mounted with the machine. The visual perception sensor is adapted to provide a three-dimensional data and to generate a plurality of windrow detection signals. The controller is configured to receive the plurality of windrow detection signals, and determine the position of a windrow relative to the machine. The controller is further configured to access steering parameters of the machine, and generate machine control commands to clear the windrow. The machine control commands include at least one of a steering command, a propulsion command, and an implement control command.

DETAILED DESCRIPTION

Figure 1:
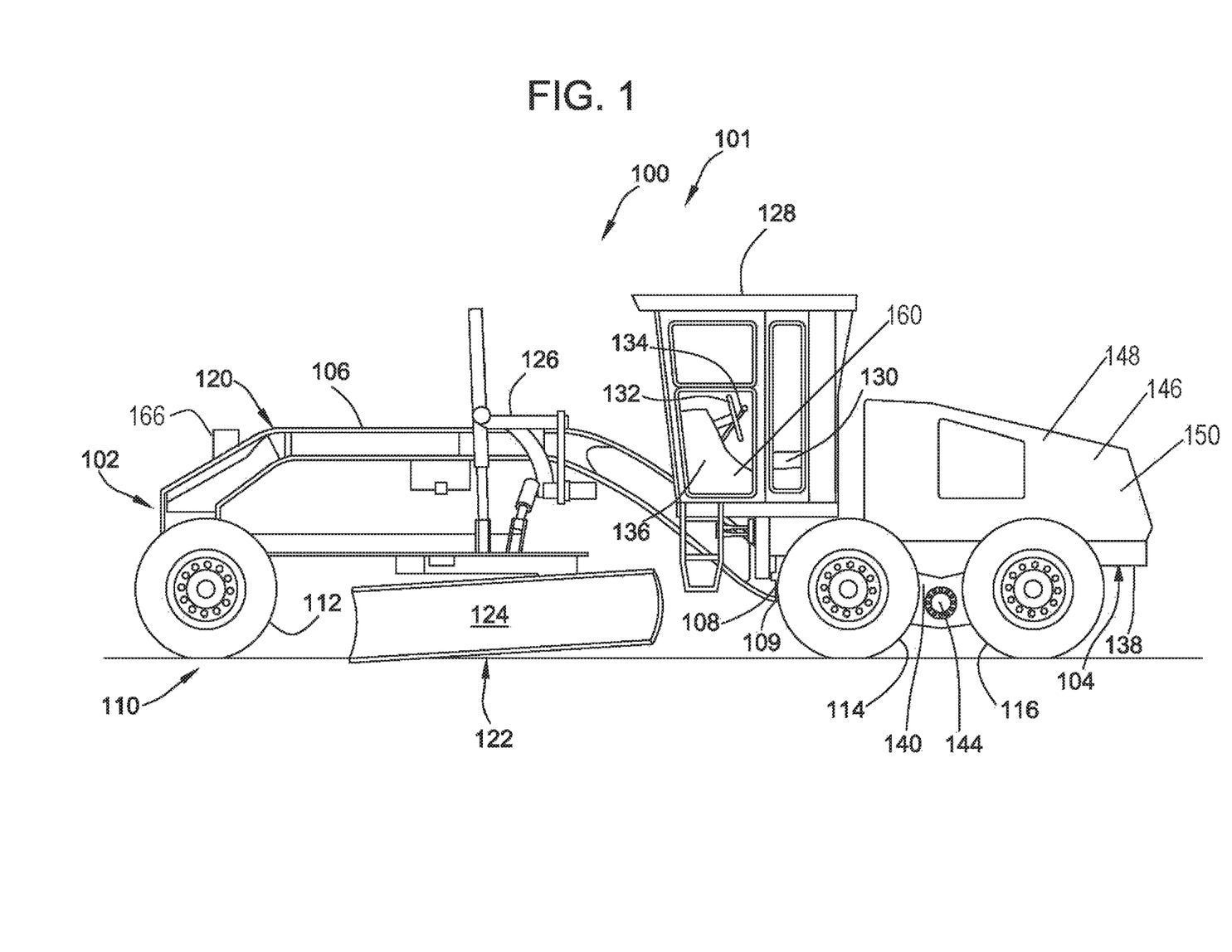
FIG. 1 is a side elevational view of a machine incorporating a control arrangement according to aspects of this disclosure.

Turning now to the drawings, an exemplary embodiment of a machine 100 in the form of a motor grader 101 is illustrated in FIG. 1. It will be appreciated that, although a motor grader 101 is illustrated in FIG. 1, the term "machine" may refer to any machine that performs some type of operation wherein a windrow may be formed in a work surface. For example, a machine 100 may alternatively be a front-end loader, harvesting equipment, snow blower, or the like.

The motor grader 101 includes a main frame 102 supporting a ground-engaging work implement 103. The main frame 102 has a rear frame portion 104 and a front frame portion 106. The rear and front frame portions 104, 106 may optionally be articulated at an articulated joint 108, which includes a hinge 109. The main frame 102 is supported on a plurality of ground engaging members 110. In the illustrated embodiment, the ground engaging members 110 include a pair of front wheels 112, which are spaced from a plurality of rear wheels 114, 116, which are disposed pairs along opposite sides of the rear frame portion 104. It will be appreciated, however, that the ground engaging members 110 may include alternate arrangements, such as, for example, the rear wheels 114, 116 may alternately be track assemblies, as are known in the art.

The front frame portion 106 includes a front frame section 120 supported between the hinge 109 and forward ground engaging members 110, here, the illustrated pair of front wheels 112. A ground engaging work implement 103 in the form of a blade assembly 122 is mounted along the front frame section 120 and may be utilized for grading. The blade assembly 122 includes a blade 124 and a linkage assembly 126 that allows the blade 124 to be moved to a variety of different positions relative to the front frame section 120. Although an exemplary blade 124 is illustrated as the attached implement, the motor grader 101 may include an additional implement such as, for example, plows, scarifiers, and rippers.

Returning to the illustrated embodiment, an operator cab 128 may be supported along the front frame section 120. The cab 128 may include, for example, a seat 130, a console 136, and a variety of operator controls, such as a steering mechanism 132, a speed-throttle or control lever 134. An operator occupying the cab 128 can control the various functions and motion of the motor grader 101, for example, by using the steering mechanism 132 to set a direction of travel for the motor grader 101 or by using the control lever 134 to set the travel speed of the machine. As can be appreciated, the representations of the various control mechanisms presented herein are generic and are meant to encompass all possible mechanisms or devices used to convey an operator's commands to a machine, including, for example, so-called joystick operation. While an operator cab 128 is shown in the illustrated embodiments, the inclusion of such a cab and associated seat, control mechanisms and console are optional in that the machine could alternately be autonomous or semi-autonomous, that is, the machine may be partially or entirely controlled by a control system that does not require operation by an on-board human operator.

The rear frame portion 104 includes a rear frame section 138 that is supported on the plurality of ground engaging members 110 along either side of the machine 100. In the illustrated embodiment, the ground engaging members 110 supporting the rear frame section 138 include two pairs of rear wheels 114, 116, only one such pair of wheels 114, 116 being visible in FIG. 1. Although the ground engaging members 110 may alternately be coupled directly to the rear frame portion 104, in the illustrated embodiment, the pairs of rear wheels 114, 116 are rotatably mounted on tandem supports 140 that are themselves pivotably mounted along either side of the rear frame section 138 at pivot shafts 144. Thus, each of the rear wheels 114, 116 rotates and the tandem supports 140 pivot about respective axes. It will be understood by those of skill in the art that the ground engaging members 110 may include alternate or additional structure, such as, for example, belts (not shown) disposed about the pairs of rear wheels 114, 116.

To assist in steering the machine 100, in some embodiments, the pairs of wheels 114, 116 along either side of the machine 100 may be separately controlled, such that the pairs of wheels 114, 116 along one side or the other of the machine 100 may be rotated at different speeds by drive units to facilitate steering of the machine 100 along a desired path. For example, the wheels 114, 116 along one side may be rotated more rapidly than the wheels (not visible in FIG. 1) along the opposite side of the machine 100 in order to assist in turning the machine 100 or maintaining the machine 100 along a desired path.

The machine 100 includes a prime mover 146, which may be of any appropriate design. For example, the prime mover 146 may include an engine 148 adapted to propel the machine 100 through operation of the ground engaging members 110. The prime mover 146 may further be coupled to a hydraulic system 150. The hydraulic system 150 may include one or more pumps (not visible) to drive or power machine operation such as, for example, steering of ground engaging members 110, such as wheels 114, 116, and operation of the linkage assembly 126 to control the position of the blade 124 relative to the frame 102.

A control module or electronic controller 160 is connected to the machine 100 and arranged to receive information from various sensors on the machine 100, process that information, and issue commands to various components within the system during operation. While the electronic controller 160 may be located remotely, in at least one embodiment, the electronic controller 160 may be disposed on the machine 100.

The electronic controller 160 may be of any conventional design having hardware and software configured to perform the calculations and send and receive appropriate signals to perform the disclosed logic. The controller 160 may include one or more controller units, and may be configured solely to perform the disclosed strategy, or to perform the disclosed strategy and other independent processes of the machine 100. The electronic controller 160 be of any suitable construction, and may include a processor (not shown) and a memory component (not shown). The processor may be microprocessors or other processors as known in the art. In some embodiments, the processor may be made up of multiple processors. In one example, the controller 160 comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

The processor may execute instructions for operation of various systems of the machine 100. In alternative embodiments, hard-wired circuitry may be used in place of or in combination with software instructions to implement desired operation. Such instructions may be read into or incorporated into a computer readable medium, such as the memory component or provided external to processor. The memory component may include any form of computer-readable media as described above. The memory component may include multiple memory components. Thus, embodiments are not limited to any specific combination of hardware circuitry and software.

The term "computer-readable medium" as used herein refers to any medium or combination of media that participates in providing instructions to processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer or processor can read.

Figure 2:
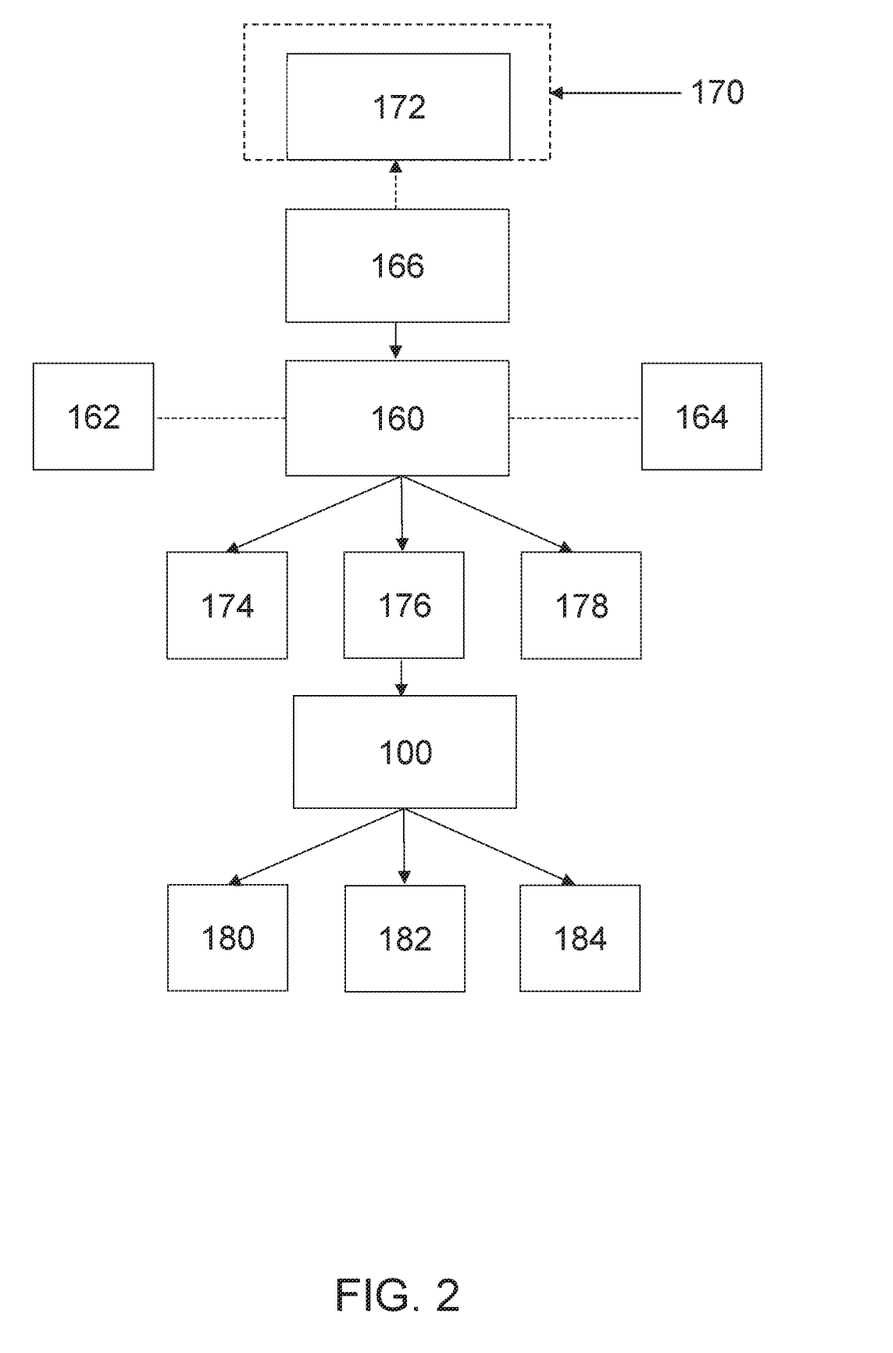
FIG. 2 is a schematic diagram of a system incorporating aspects of the control arrangement of this disclosure.

Referring to FIG. 2, a number of connections pertinent to the present description are shown but, as can be appreciated, a greater number of other connections may be present relative to the controller 160. For example, the controller 160 may be connected to receive signals from a plurality of sensors (shown generally as 162) and control inputs (shown generally as 164). Sensors 162 may include, for example, sensors related to the relationship of the machine 100 to the surrounding environment, such as ground speed sensors, and sensors related to operation or positions of the machine components, such as positional sensors in connection with the position of the blade 124 or the positions of swashplates of respective pumps of the hydraulic drive system 150. Control inputs 164 may include, for example, the steering mechanism 132, and the speed-throttle or control lever 134 moveable by the operator of the machine 100 used to set a desired directional setting for the machine 100. A control signal from a control input 164 relayed to the controller 160 may be used in a calculation, along with other parameters, for example, the speed of the engine 148, the ground speed of the machine 100, and additional sensors 162 to yield a desired operation of the machine 100.

Windrows may be formed by a tool, such as a blade 124 displacing material from a work surface. According to an aspect of this disclosure, the machine 100 may be operated autonomously or semi-autonomously to clear such windrows. In order to facilitate such autonomous or semi-autonomous clearing of windrows, the machine 100 is provided with at least one visual perception sensor 166 that is adapted to provide three-dimensional data. In at least one embodiment, the visual perception sensor 166 is provided at a forward position on the front frame section 120 in order to provide, when viewed from the direction of travel, an unobstructed view of the work surface in front of the machine 100. It will be appreciated, however, that the at least one visual perception sensor 166 may be alternatively located elsewhere/at another location, so long as the visual perception sensor 166 is provided with an appropriate view of the work surface from which the windrow is to be cleared.

The at least one visual perception sensor 166 may include any appropriate visual perception sensor adapted to provide three-dimensional data, such as, for example, a stereo camera, a three-dimensional camera, a LiDAR sensor, and the like. Further, the at least one visual perception sensor 166 may include a plurality of such visual perception sensors 166, and may include a sensor adapted to provide two-dimensional data.

Referring to FIG. 2, the visual perception sensor 166 views the surrounding work surface 170, for example, located in front of the machine 100 to detect a windrow 172. Windrow detection signals are relayed to the electronic controller 160 from which the electronic controller 160 locates the windrow 172. The electronic controller 160 generates control commands to instruct the machine 100 to clear the windrow. By way of example, such control commands may include one or more steering commands 174, one or more propulsion commands 176, and/or one or more implement control commands 178. The generated control commands then result in any necessary adjustments in the corresponding control systems machine 100, e.g., a steering system 180, propulsion system 182, and/or a blade control system 184, to appropriately steer or propel the machine 100 and/or adjust the position and the placement of the blade 124. For example, the controller 160 may identify the desired speeds of the pair of wheels 114, 116 to propel and steer the machine 100 based upon the location of the windrow 172 relative to the machine 100 and various input received by the controller 160 to control, for example, the displacement of hydraulic pumps, the displacement or speed of hydraulic motors, the speed of the rear wheels 114, 116, the speed of the front wheels 112, the steering angle of the front wheels 112, and the articulation of rear and front frame portions 104, 106, if applicable.

It will be appreciated by those of skill in the art that features outside of a windrow may cause irregularities or noise in three-dimensional data developed by a visual perception sensor 166. For example, environmental features, such as trees, may result in irregularities or noise in the three-dimensional data in some applications. Accordingly, noise-reduction techniques or devices may be utilized in conjunction with the use of the at least one visual perception sensor 166. In at least one embodiment, in addition to a three-dimensional camera, the at least one visual perception sensor 166 may include a two-dimensional camera adapted to provide two-dimensional data. In such an arrangement, a two-dimensional camera may be physically separate from a three-dimensional camera or may be mounted with a three-dimensional camera or sensor as part of a stereo camera or a LiDAR sensor, for example. In such an arrangement, the two-dimensional camera of the at least one visual perception sensor 166 may be utilized to initially identify a general location of windrow. Those of skill in the art will appreciate that a system for the identification of a windrow utilizing a two-dimensional image may be developed through machine learning and the utilization of a large number of images. It will be further appreciated that the identification of a windrow through the use of two-dimensional data may assist in reduction of the noise that may be associated with three-dimensional data, allow the system to focus on the locational data pertinent to a detected windrow.

INDUSTRIAL APPLICABILITY

The present disclosure is applicable to a machine 100 that may be utilized in autonomously or semi-autonomously clearing windrows.

Figure 3:
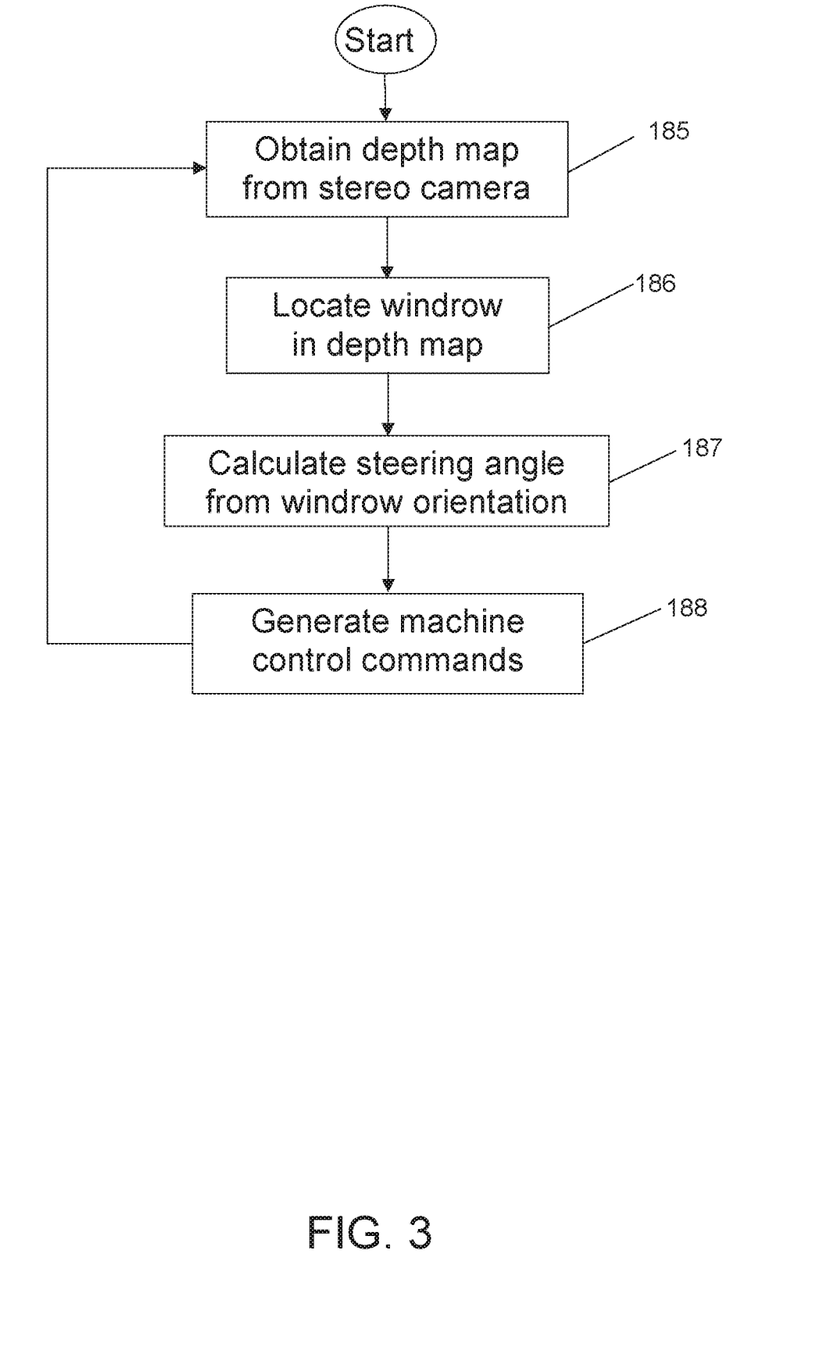
FIG. 3 is a flow chart of a control arrangement according to aspects of this disclosure.

Turning to FIG. 3, there is illustrated an exemplary controller-implemented method according to the present disclosure. The at least one visual perception sensor 166 is utilized to obtain a depth map from the viewed image(s) (stage 185). A windrow, if any, is then located in the depth map (stage 186). A steering angle is then calculated from the windrow orientation (stage 187), and machine control commands are then generated to cause the machine 100 to clear the windrow (stage 188). The method continues as the machine 100 is propelled and steered to clear the windrow, generating successive machine control commands to clear the windrow.

Figure 4:
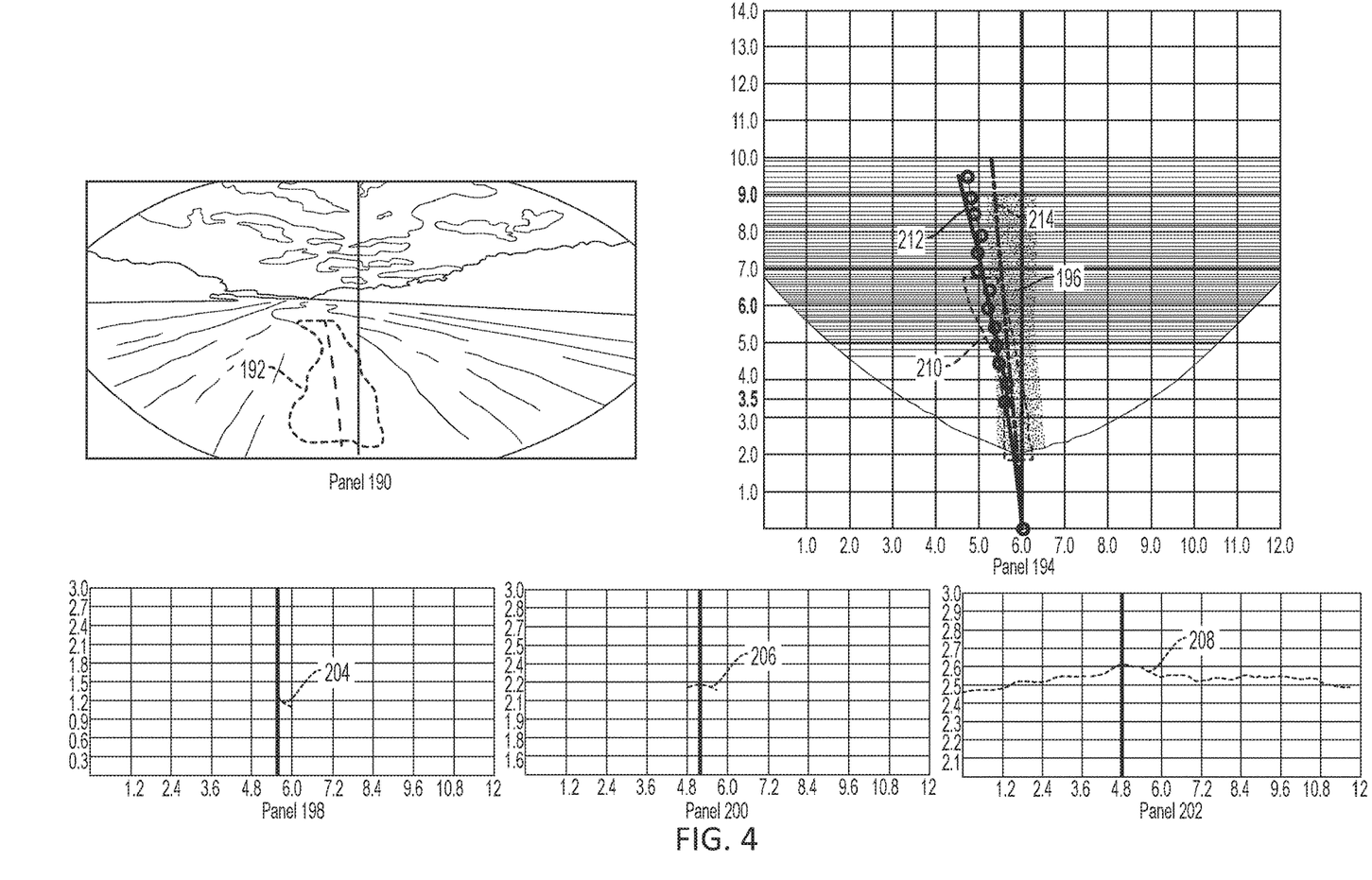
FIG. 4 are graphic representations of the implementation of a system and control arrangement according to aspects of this disclosure.

Turning to FIG. 4, there is illustrated an exemplary arrangement for the determination of a location of a windrow utilizing a two-dimensional camera and a three-dimensional camera, and the determination of a desired steering angle to clear a windrow. Panel 190 of FIG. 4 shows a two-dimensional view of a work surface in front of the machine, a windrow 192 being visible in the two-dimensional view. Panel 194 shows a corresponding top down view of a three-dimensional depth map generated from the three-dimensional camera. The vertical axis of the depth map shows the distance from the camera forward, while the horizontal axis identifies the transverse direction. The three-dimensional depth map illustrated in panel 194 has been cleaned after noise removal based upon data provided from the identification of a windrow 192 in the two-dimensional view. The windrow 192 may be seen as a slightly shaded portion 196 on the depth map. Using perspective transform, the coordinates of the windrow 192 from the two-dimensional view of panel 190 are likewise illustrated on the depth map of panel 194 as a box framed by a broken line (identified generally as 210 in panel 194). Those of skill in the art will appreciate that the coordinates 210 of the two-dimensional view relatively closely follow the -shaded portion 196 identified on the depth map.

From the depth map, the depth of the work surface is determined at identifiable distances forward the camera. In this illustration, the depths at 3.5 meters, 6 meters, and 9 meters forward the camera are shown in the cross-sections of the depth map in panels 198, 200, and 202, respectively. In each of the cross-sections of the depth map, a boldface vertical line identifies the highest peak (204, 206, 208, respectively) of the windrow 192 at the identified distances forward the camera. The positions where the cross-sections are taken in panels 198, 200, 202 are illustrated in the depth map of panel 194 as horizontal lines at 3.5 meters, 6 meters, and 9 meters. While the illustrated cross-sections are taken at 3.5 meters, 6 meters and 9 meters, it will be appreciated that these distances are exemplary, and cross-sections may be taken at alternative or additional distances from forward the camera. The locations of the peak 204, 206, 208 of each respective cross-section of the depth map (panels 198, 200, 202) as well as a plurality of other depths are used to identify the location of the windrow 192 in the depth map (panel 194) with a plurality of circles. A curved line 212 connects the identified peaks 204, 206, 208 of the windrow 192 at various distances in the depth map of panel 194 to graphically illustrate the contour of the windrow 192 within the depth map (panel 194).

Accordingly, referring to the depth map of panel 194, the curved line 212 connecting the location of the identified peaks of the windrow illustrates the determined location of the windrow 192. A desired steering angle may then be determined based upon the determined location of the windrow 192 in the depth map (panel 194). In this embodiment, the desired steering angle is determined based upon a tangent to the calculated location of the windrow 192, illustrated as a boldface hatched line 214 in panel 194. Those of skill in the art will appreciate that the steering angle is successively updated as the machine 100 moves forward, and successive images are provided by the two-dimensional and three-dimensional cameras. Those of skill in the art will appreciate that similar two and three-dimensional information may be provided by a stereo camera or a LiDAR sensor.

Figure 5:
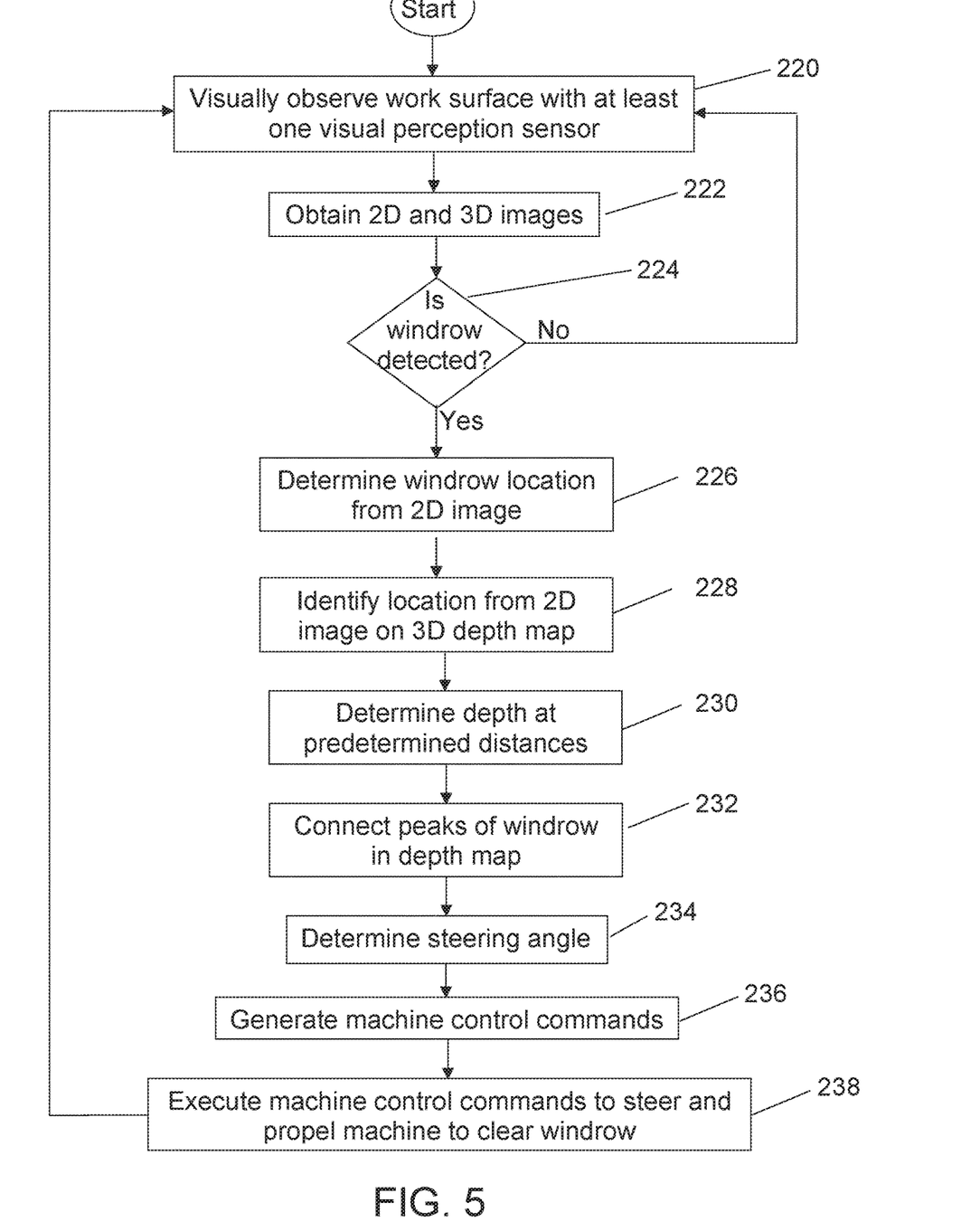
FIG. 5 is a flow chart of an exemplary control arrangement according to aspects of this disclosure.

Turning now to the flow chart of FIG. 5, there is illustrated an embodiment of an exemplary method according to this disclosure. At panel 220, the visual perception sensor inspects the work surface to obtain two-dimensional image and three-dimensional depth map (panel 222). It is then determined whether a windrow is detected (panel 224). If no windrow is detected, the visual perception sensor iteratively continues to inspect the work surface (panel 220), obtain two-dimensional image and three-dimensional depth map (panel 222), and determine if a windrow is detected (panel 224), until a windrow is detected at panel 224. Based upon the two-dimensional image, the visual perception sensor generates windrow detection signals from which the position of the detected windrow relative to the machine is determined (panel 226). The location of the windrow identified based upon the two-dimensional image is identified on the three-dimensional depth map (panel 228). This transfer of information from the two-dimensional image to the depth map may be based upon, for example, perspective transform.

In order to more specifically identify the location of the windrow in the depth map, the depth of the windrow is determined at predetermined distances from the visual perception sensor in view of the transferred two-dimensional image (panel 230). The depth may be determined based upon a cross-section of the depth map as illustrated, for example, in panel 194 of FIG. 4. The location of the peak of the windrow in each cross-section is identified in the depth map and connected by a line (panel 232) to identify more precisely identify the location of the windrow relative to the machine. The steering angle to clear the windrow is then determined based upon the identified location of the windrow in the depth map (panel 234).

Machine control commands are then generated at panel 236 based upon the detected position of the windrow, as well as the control and steering parameters of the machine. Based upon the machine control commands, the machine is then steered and propelled along an identified clearance direction at panel 238. The system then continues to inspect the work surface at panel 220 to successively detect and identify the location of the windrow, determine the steering angle, generate and execute machine control commands, and adjusting the steering direction and propulsion as necessary.

Figure 6:
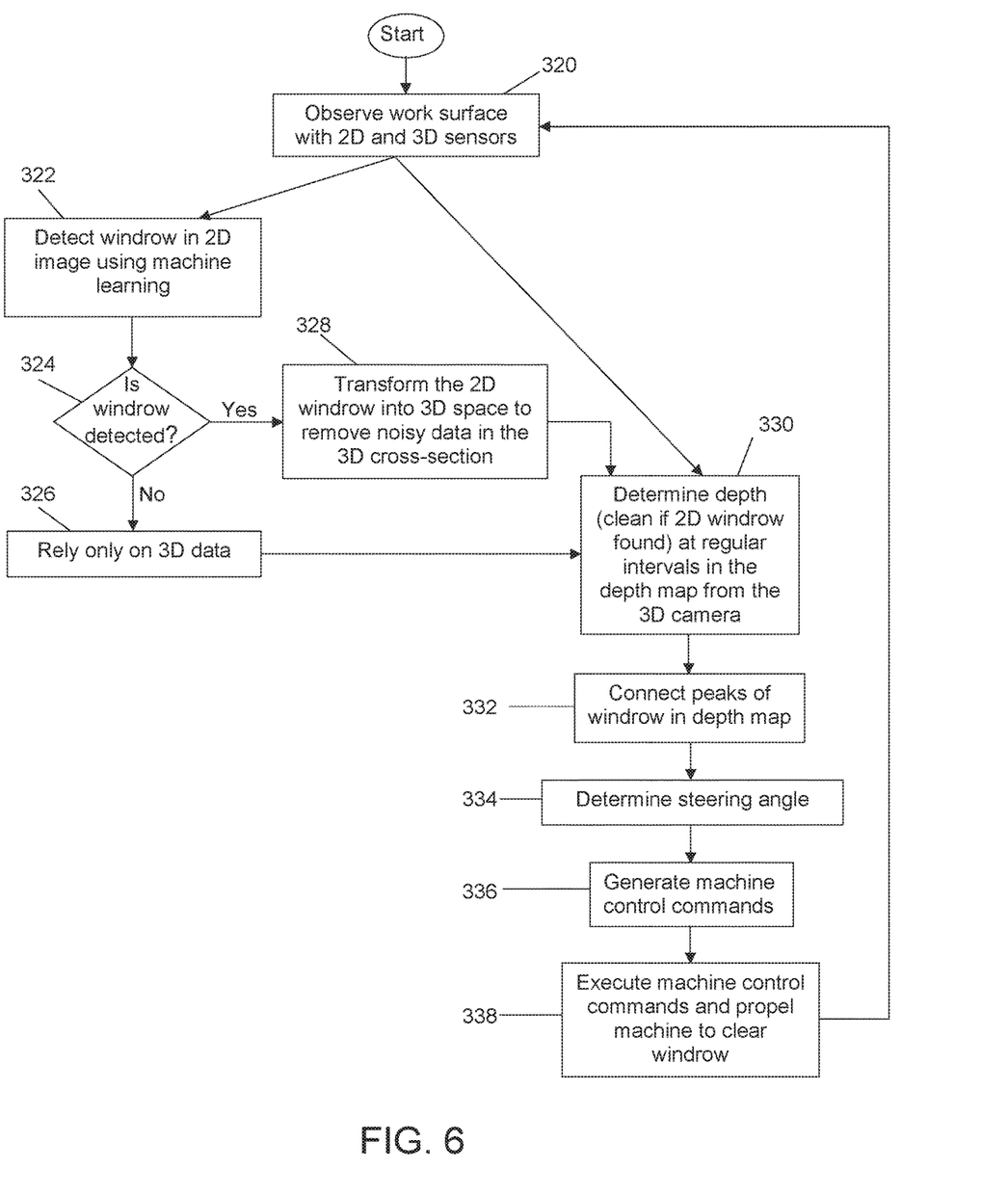
FIG. 6 is a flow chart of another exemplary control arrangement according to aspects of this disclosure.

Another embodiment of an exemplary method according to this disclosure is illustrated in the flow chart of FIG. 6. At panel 320, the one or more visual perception sensors inspect the work surface to obtain two-dimensional image and three-dimensional depth map. At panel 322, machine learning is utilized to detect windrows in the resultant two-dimensional image. At panel 324, it is determined whether a windrow is detected in the two-dimensional image. Conversely, if no windrow is detected, the system relies only on data obtained from the three-dimensional perception sensor (panel 326). If a windrow is detected in the two-dimensional image, the windrow from the two-dimensional image is transformed to the three-dimensional depth map to remove noisy data in the three-dimensional depth map (panel 328).

In order to more specifically identify the location of the windrow in the depth map, the depth of the windrow is determined at regular intervals from the visual perception sensor (panel 330). The depth may be determined based upon a plurality of cross-sections of the depth map as illustrated, for example, in panel 194 of FIG. 4. The location of the peak of the windrow in each cross-section is identified in the depth map and connected by a line (panel 332) to identify more precisely identify the location of the windrow relative to the machine. The steering angle to clear the windrow is then determined based upon the identified location of the windrow in the depth map (panel 334).

Machine control commands are then generated at panel 336 based upon the detected position of the windrow, as well as the control and steering parameters of the machine. Based upon the machine control commands, the machine is then steered and propelled along an identified clearance direction at panel 338. The system then continues to iteratively inspect the work surface at panel 320 to successively detect and identify the location of the windrow, determine the steering angle, generate and execute machine control commands, and adjusting the steering direction and propulsion as necessary.

The methods and systems of this disclosure may be applicable to machines used in clearing windrows. In this regard, the methods and systems may be particularly useful with machines, such as motor graders, that are utilized in road clearing.

Some of the disclosed methods and systems may be useful in facilitating machines remaining consistently productive without regard to a human operator or environmental conditions.

In addition, autonomous systems may permit operation in environments that are unsuitable or undesirable for a human operator. Autonomous or semi-autonomous systems may also compensate for inexperienced human operators as well as inefficiencies associated with repetitive tasks.

Some of the disclosed methods and systems may be useful in machines required to perform complicated tasks or tasks that require manipulation of various controls simultaneously. Some of the disclosed systems and methods may additionally be useful in machines that present particular steering challenges, such as machines that include a front frame member, a rear frame member, and an articulation joint connecting the front and rear frame members, as well as a movable tool.

Some of the disclosed methods and systems may provide arrangements that may adjust to changing conditions by dynamically determining a desired steering path.

Some of the disclosed methods and systems may not require a separate control center in that the detection, analyses, and generation of control commands are performed by onboard equipment and software.

Some the methods and systems according to this disclosure may provide economical alternatives to more complicated arrangements that require more expensive mmWave sensors or high precision GPS systems onboard machines. Additionally, some methods and systems may utilize hardware and software already present on a machine. Further, inasmuch as the disclosed methods and systems do not require GPS, the methods and systems not be susceptible to the limitations of GPS. For example, some of the disclosed methods and systems may be particularly useful in locations where GPS may provide inaccurate results, such as cities or tunnels.

It will be apparent to those skilled in the art that various modifications and variations can be made to the windrow detection and clearing systems and procedures of the present disclosure. Other embodiments of the described methods and systems will be apparent to those skilled in the art from consideration of the disclosure herein. It is intended that the specification and examples of this disclosure be considered as exemplary only, with a true scope of the disclosure being indicated by the following claims and their equivalents. It is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for autonomously clearing a windrow along a work surface using a machine, the method comprising:
    observing the work surface via a visual perception sensor coupled to a controller, the visual perception sensor being adapted to provide three-dimensional data and two-dimensional data of the work surface at a same time;
    determining whether the windrow is detected using the two-dimensional data of the work surface;
    under a condition whether the windrow is not detected using the two-dimensional data of the work surface, detecting the windrow using only the three-dimensional data of the work surface;
    generating, via the controller, a plurality of windrow visual detection signals using the three-dimensional data of the work surface or the two-dimensional data transformed into three-dimensional space, depending upon whether the windrow is detected using the two-dimensional data of the work surface;
    determining a position of the windrow relative to the machine based on the plurality of windrow visual detection signals; and
    generating, via the controller, a plurality of machine control commands to clear the windrow based on the determined position of the windrow relative to the machine.

2. The method of claim 1,
    wherein said machine is an autonomous machine, and
    wherein utilizing a visual perception sensor comprises utilizing at least one of a stereo camera, a three-dimensional camera, and a LiDAR sensor coupled to the machine.

3. The method of claim 1, wherein said generating machine control commands comprises generating at least one steering command.

4. The method of claim 3, wherein said generating machine control commands further comprises generating at least one propulsion command.

5. The method of claim 3, wherein said generating machine control commands further comprises generating at least one implement control command.

6. The method of claim 5, wherein said generating machine control commands further comprises generating at least one propulsion command.

7. The method of claim 1, wherein said determining a position of the windrow comprises determining a plurality of depths of the windrow respectively at a plurality of predetermined distances from the visual perception sensor to identify a corresponding plurality of peaks of the windrow at each of the plurality of predetermined distances, and electronically connecting the plurality of peaks using the controller.

8. The method of claim 1, further comprising:
propelling the machine to a successive machine position in response to said generated machine control commands; and
utilizing the visual perception sensor to successively detect said windrow, generating a successive plurality of windrow detection signals, determining a successive position of the windrow relative to the machine, and generating successive control commands to clear the windrow.

9. The method of claim 1,
wherein the machine is an autonomous machine,
wherein the autonomous machine is a grading machine,
wherein the grading machine has a windrow-forming blade, and
wherein the transformation of the two-dimensional data into three-dimensional space is a perspective transform.

10. A system for automated control of a machine to clear a windrow along a work surface, the system comprising:
a visual perception sensor system adapted to generate a plurality of windrow detection signals, the visual perception sensor system being adapted to provide three-dimensional data of the work surface and to provide two-dimensional data of the work surface at a same time, the visual perception sensor system adapted to be mounted to the machine; and
a controller configured to:
observe the work surface via the visual perception sensor system;
determine whether the windrow is detected using the two-dimensional data of the work surface;
under a condition whether the windrow is not detected using the two-dimensional data of the work surface, detect the windrow using only the three-dimensional data of the work surface;
receive the plurality of windrow detection signals based on the three-dimensional data of the work surface or the two-dimensional data transformed into three-dimensional space, depending upon whether the windrow is detected using the two-dimensional data of the work surface;
determine the position of the windrow relative to the machine;
access steering parameters of the machine; and
generate machine control commands to clear the windrow based on the determined position of the windrow relative to the machine and the accessed steering parameters of the machine, the machine control commands comprising at least one of a steering command, a propulsion command, and an implement control command,
wherein the visual perception sensor system comprises at least a two-dimensional sensor to provide two-dimensional data of the work surface and a three-dimensional sensor to provide the three-dimensional data of the work surface.

11. The system of claim 10, wherein the controller is configured to generate machine control commands comprising at least two of the steering command, the propulsion command, and the implement control command.

12. The system of claim 10, wherein the windrow detection signals are indicative of an orientation of the windrow relative to a frame of the visual perception sensor system.

13. The system of claim 10, wherein the controller is configured to generate the machine control commands based upon a determined position of the windrow relative to the machine and steering parameters of the machine.

14. The system of claim 10, wherein the visual perception sensor system is adapted to generate successive windrow detection signals with movement of the visual perception sensor system relative to the work surface, and the controller is further configured to:
receive the successive windrow detection signals;
successively determine the position of the windrow relative to the machine; and
generate successive machine control commands to propel the machine to a successive machine position to clear the windrow.

15. The system of claim 10,
wherein said machine is an autonomous machine,
wherein said autonomous machine has a windrow-forming blade.

16. The system of claim 10, wherein the two-dimensional sensor and the three-dimensional sensor are at a forward position of the machine to provide an unobstructed view of the work surface in front of the machine.

17. The system of claim 10,
wherein the two-dimensional data is transformed into the three-dimensional space via perspective transform, and
wherein said determining the position of the windrow relative to the machine includes:
electronically determining a plurality of peaks of the windrow; and
electronically connecting the plurality of peaks of the windrow.

18. A grading machine, comprising:
a prime mover;
a blade to engage a work surface along a path;
a visual perception sensor system adapted to generate a plurality of windrow detection signals, the visual perception sensor system being adapted to provide three-dimensional data and two-dimensional data of the work surface at a same time, the visual perception sensor system being coupled to the grading machine; and
a controller configured to:
observe the work surface via a visual perception sensor system;
determine whether the windrow is detected using the two-dimensional data of the work surface;
under a condition whether the windrow is not detected using only the two-dimensional data of the work surface, detect the windrow using only the three-dimensional data of the work surface;
receive the plurality of windrow detection signals based on the three-dimensional data of the work surface or the two-dimensional data transformed into three-dimensional space, depending upon whether the windrow is detected using the two-dimensional data of the work surface;
determine the position of a windrow relative to the grading machine;
access steering parameters of the grading machine; and
generate machine control commands to clear the windrow based on the determined position of the windrow relative to the grading machine and the accessed steering parameters of the grading machine, the machine control commands comprising at least one of a steering command, a propulsion command, and an implement control command, wherein the visual perception sensor system comprises a two-dimensional sensor and a three-dimensional sensor.

19. The grading machine of claim 18, further comprising a front frame portion supported by a plurality of front ground engaging members, a rear frame portion comprising a plurality of rear ground engaging members, and an articulated joint between the front frame portion and the rear frame portion.

20. The grading machine of claim 18, wherein the two-dimensional sensor and the three-dimensional sensor are at a forward position of the grading machine to provide an unobstructed view of the work surface in front of the grading machine.

* * * * *